United States Patent
Williams et al.

(10) Patent No.: US 8,816,196 B2
(45) Date of Patent: Aug. 26, 2014

(54) PRESSURE BALANCED CONNECTOR TERMINATION

(71) Applicant: ITT Manufacturing Enterprises LLC, Wilmington, DE (US)

(72) Inventors: Roger C. Williams, Santa Rosa, CA (US); Bradley Dean Rush, Santa Rosa, CA (US)

(73) Assignee: ITT Manufacturing Enterprises LLC, Wilmington, DE (US)

(*) Notice: Subject to any disclaimer, the term of this patent is extended or adjusted under 35 U.S.C. 154(b) by 163 days.

(21) Appl. No.: 13/644,782

(22) Filed: Oct. 4, 2012

(65) Prior Publication Data

US 2014/0096992 A1 Apr. 10, 2014

(51) Int. Cl.
| | |
|---|---|
| H01B 7/18 | (2006.01) |
| H02G 15/04 | (2006.01) |
| H01R 13/52 | (2006.01) |
| H01R 13/523 | (2006.01) |
| E21B 33/04 | (2006.01) |
| H01B 13/22 | (2006.01) |

(52) U.S. Cl.
CPC ............ *H01B 7/1805* (2013.01); *H02G 15/04* (2013.01); *H01R 13/5205* (2013.01); *H01R 13/523* (2013.01); *E21B 33/04* (2013.01); *H01B 13/221* (2013.01); *H01R 13/5216* (2013.01)
USPC ........ 174/20; 174/23 R; 174/77 R; 174/11 R; 439/272

(58) Field of Classification Search
USPC ................. 174/20, 23 R, 77 R, 11 R; 29/887; 439/272
See application file for complete search history.

(56) References Cited

U.S. PATENT DOCUMENTS

| | | | |
|---|---|---|---|
| 3,641,479 A | 2/1972 | O'Brien | |
| 3,729,699 A | 4/1973 | Briggs | |
| 4,080,025 A | 3/1978 | Garnier | |
| 4,105,279 A | 8/1978 | Glotin | |
| 4,142,770 A | 3/1979 | Butler | |
| 4,174,875 A | 11/1979 | Wilson | |

(Continued)

FOREIGN PATENT DOCUMENTS

| | | |
|---|---|---|
| CN | 100431226 C | 11/2008 |
| CN | 101976782 A | 2/2011 |

(Continued)

OTHER PUBLICATIONS

International Search Report, dated Mar. 21, 2014, corresponding to counterpart International Patent Application No. PCT/US2013/062798.

*Primary Examiner* — Dhirubhai R Patel
(74) *Attorney, Agent, or Firm* — RatnerPrestia

(57) ABSTRACT

A pressure-balanced sleeve assembly for an electrical cable termination is disclosed. The sleeve assembly includes an outer sleeve surrounding the electrical cable; a chamber defined between the outer sleeve and the electrical cable; dielectric fluid contained within the chamber; and a seal that is positioned between the outer sleeve and the electrical cable to delimit and seal an end of the chamber to prevent the escapement of the dielectric fluid from the chamber, the seal being moveable along the cable in response to differences between a pressure within the chamber and a pressure outside of the chamber. Also disclosed herein is a pressure-balanced electrical cable assembly and a method of pressure-balancing a termination of an electrical cable.

18 Claims, 2 Drawing Sheets

(56) References Cited

U.S. PATENT DOCUMENTS

| | | |
|---|---|---|
| 4,390,229 A | 6/1983 | Chevalier |
| 4,488,765 A | 12/1984 | Erbe |
| 4,500,151 A | 2/1985 | Ayers |
| 4,500,156 A | 2/1985 | Nguyen |
| 4,515,426 A | 5/1985 | Bager |
| 4,561,679 A | 12/1985 | Choate |
| 4,589,717 A | 5/1986 | Pottier |
| 4,767,349 A | 8/1988 | Pottier |
| 4,780,574 A | 10/1988 | Neuroth |
| 4,797,117 A | 1/1989 | Ayers |
| 4,859,196 A | 8/1989 | Durando |
| 4,880,390 A | 11/1989 | Brackmann |
| 4,948,377 A | 8/1990 | Cairns |
| 5,334,032 A | 8/1994 | Myers |
| 5,645,442 A | 7/1997 | Cairns |
| 5,760,334 A | 6/1998 | Ziemek |
| 5,899,765 A | 5/1999 | Niekrasz |
| 6,200,152 B1 | 3/2001 | Hopper |
| 6,780,037 B1 | 8/2004 | Parmeter |
| 6,796,821 B2 | 9/2004 | Cairns |
| 6,832,924 B2 | 12/2004 | Maletzki |
| 6,916,193 B2 | 7/2005 | Varreng |
| 6,932,636 B2 | 8/2005 | Abbey |
| 7,112,080 B2 | 9/2006 | Nicholson |
| 7,367,848 B2 | 5/2008 | John |
| 7,533,461 B2 | 5/2009 | Griffiths |
| 7,695,301 B2 | 4/2010 | Mudge |
| 7,737,361 B2 * | 6/2010 | Huspeni et al. ............ 174/74 R |
| 7,767,908 B2 * | 8/2010 | Sylvan ....................... 174/74 R |
| 7,806,708 B2 | 10/2010 | Erstad |
| 7,828,573 B2 | 11/2010 | Butaud |
| 7,955,105 B2 | 6/2011 | Maeland |
| 7,959,454 B2 | 6/2011 | Ramasubramanian |
| 8,025,506 B2 | 9/2011 | Cairns |
| 2007/0040459 A1 | 2/2007 | Oh |
| 2007/0169954 A1 | 7/2007 | Bertini et al. |
| 2011/0306225 A1 | 12/2011 | Chaize |
| 2012/0100738 A1 | 4/2012 | Palinkas et al. |
| 2013/0312996 A1 | 11/2013 | Nicholson |
| 2014/0099812 A1 | 4/2014 | Burrow et al. |

FOREIGN PATENT DOCUMENTS

| | | |
|---|---|---|
| EP | 0637675 | 2/1995 |
| EP | 0902505 A2 | 3/1999 |
| EP | 2386714 A2 | 11/2011 |

* cited by examiner

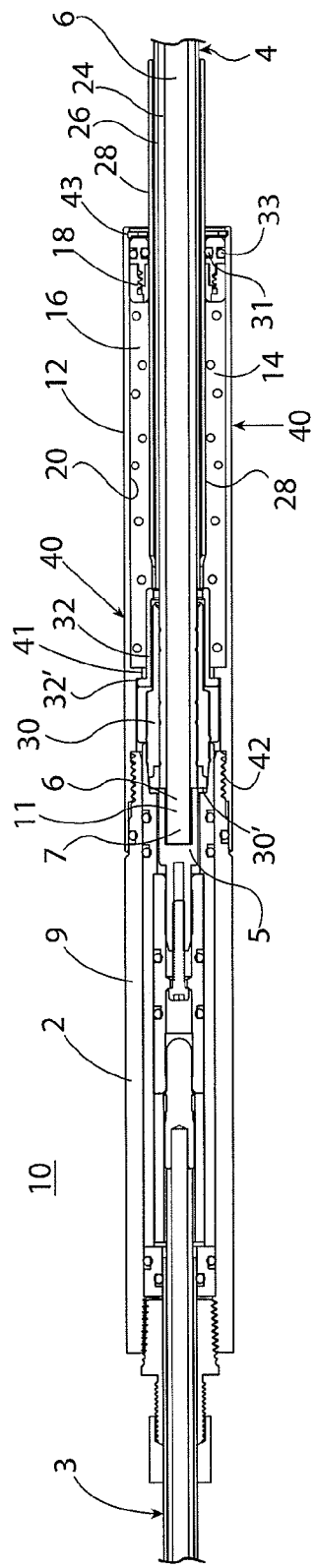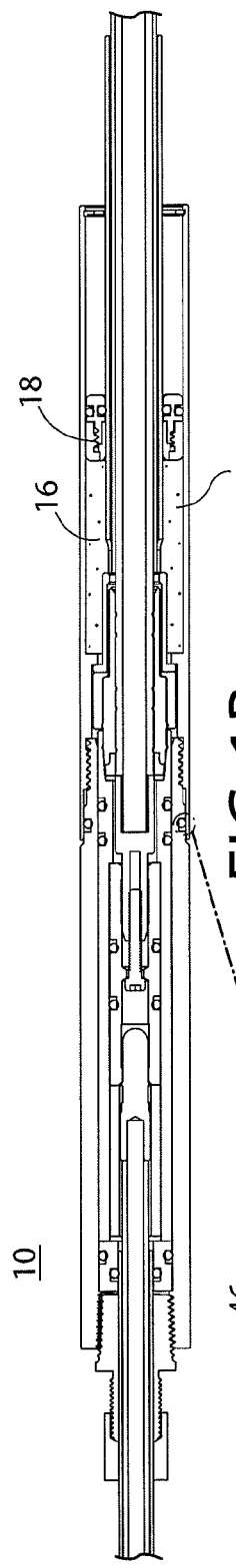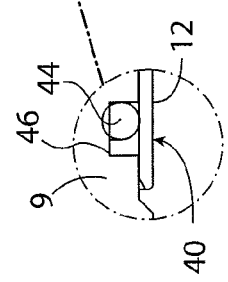

PRESSURE BALANCED CONNECTOR TERMINATION

FIELD OF THE INVENTION

This invention generally relates to a pressure-balanced electrical connector having a chamber filled with dielectric fluid.

BACKGROUND OF THE INVENTION

Power cables, which may be used for electric submersible pumps (ESP) in oil wells, are typically constructed with a copper conductor, an insulator that surrounds the copper conductor, and a lead sheath that surrounds the insulator. Lead-sheathed power cables are known and disclosed in, for example, U.S. Pat. No. 4,780,574 to Neuroth and U.S. Pat. No. 5,760,334 to Ziemek, each of which are incorporated by reference herein in their entirety.

The lead material of the lead sheath protects the insulator of the power cable from damage resulting from the deleterious gases of the harsh oil well environment. The lead material of the lead sheath may also protect rubber sealing elements that are used to terminate these power cables. The rubber sealing elements are particularly vulnerable to explosive decompression and other types of damage caused by the gases.

Lead is commonly used because it is substantially impermeable to gas and moisture, inexpensive, flexible, ductile and easily removable. However, many of these qualities also make the lead sheath susceptible to damage upon changes in pressure and temperature if attempts are made to rigidly attach the lead sheath to a metal shell of a connector.

The invention described herein maintains the gas permeation protection provided by the lead material while offering a robust solution that can better withstand mechanical handling as well as changes in pressure and temperature.

SUMMARY OF THE INVENTION

The above-described gas permeation protection is provided by a pressure balanced chamber of dielectric fluid, such as grease, oil or silicone, surrounding the connector termination.

According to one aspect of the invention, a pressure-balanced sleeve assembly for an electrical cable termination is disclosed. The pressure-balanced sleeve assembly comprises an outer sleeve surrounding an electrical cable; a chamber defined between the outer sleeve and the electrical cable; dielectric fluid contained within the chamber; and a seal that is positioned between the outer sleeve and the electrical cable to delimit and seal an end of the chamber to prevent the escapement of the dielectric fluid from the end of the chamber, the seal being moveable along the cable in response to differences between a pressure within the chamber and a pressure outside of the chamber.

According to another aspect of the invention, a pressure-balanced electrical cable assembly is disclosed. The pressure-balanced electrical cable assembly comprises an electrical cable; an outer sleeve surrounding the electrical cable; a chamber defined between the outer sleeve and the electrical cable; dielectric fluid contained within the chamber; and a seal that is positioned between the electrical cable and the outer sleeve to delimit and seal an end of the chamber in order to prevent the escapement of the dielectric fluid from the end of the chamber, the seal being moveable along the cable in response to differences between a pressure within the chamber and a pressure outside of the chamber.

According to yet another aspect of the invention, a method of pressure-balancing a termination of an electrical cable comprises the steps of: positioning a seal within an outer sleeve; positioning the electrical cable within the outer sleeve and through a hole in the seal such that the seal is capable of translating along a surface of the electrical cable; and distributing dielectric fluid within a chamber that is defined between the outer sleeve and the electrical cable and is delimited by the seal.

These and other aspects of the present invention will become clear from the detailed discussion below when taken into consideration with the drawings. It is to be understood that the following discussion is intended merely to illustrate the preferred embodiment of the present invention. However, the present invention is not limited to the illustrated embodiment, but is limited solely by the claims appended to this specification.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures:

FIG. 1A depicts a cross-sectional view of a power cable assembly, according to one exemplary embodiment of the invention.

FIG. 1B depicts the power cable assembly of FIG. 1A exposed to external pressure.

FIG. 2 depicts a detailed view of the power cable assembly of FIG. 1B showing a connection between components of the power cable assembly.

DETAILED DESCRIPTION OF THE INVENTION

Figure 3A:
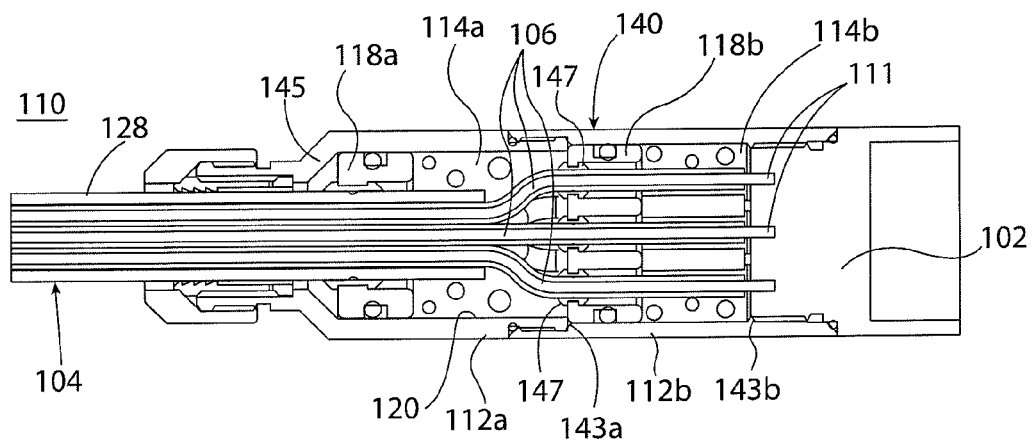
FIG. 3A depicts a cross-sectional view of another power cable assembly, according to another exemplary embodiment of the invention.

The invention will next be illustrated with reference to the figures. Such figures are intended to be illustrative rather than limiting and are included herewith to facilitate explanation of the present invention. In the figures, like item numbers refer to like elements throughout. Also, in the figures, many of the components of the power cable assembly are shown in cross-section and have a cylindrical shape.

As used herein, the term 'proximal' refers to a position that is near a connection point 11 or 111, and the term 'distal' refers to a position that is distant from the connection point 11 or 111.

FIGS. 1A and 1B depict a cross-sectional view of a power cable assembly 10 according to one exemplary embodiment of the invention. In FIG. 1B, the power cable assembly 10 of FIG. 1A is shown exposed to external fluid pressure. The power cable assembly 10 generally includes a power cable sub-assembly 2 that is configured to be connected to a power cable 4 by a sleeve assembly 40.

The power cable sub-assembly 2 comprises several interconnected components including a power cable 3 that is electrically and mechanically connected to a socket 5, and an outer sleeve 9 that surrounds the socket 5 and the terminal end of the power cable 3. The power cable sub-assembly 2 is configured to be connected to the power cable 4. More particularly, the socket 5 of the power cable sub-assembly 2 is configured to receive the terminal end 7 of the copper conductor 6 of the power cable 4. Power and/or signals can be transferred between the power cable sub-assembly 2 and the power cable 4 at a power connection point 11 that is defined at the intersection of the socket 5 and the terminal end 7 of the copper conductor 6.

The power cable 4 includes the copper conductor 6, an EPDM insulative shield 24 that surrounds the copper conductor 6, and a lead barrier 26 that is molded over the EPDM insulative shield 24. The lead barrier 26 protects the EPDM insulative shield 24 from exposure to harmful gasses and liquids that surround the power cable 10 in use. The lead barrier 26 is an optional component of the power cable 4 and may be omitted.

The power cable 4 also includes a stainless steel tube 28 that surrounds the lead barrier 26, a rubber boot seal 30 that is positioned over the ends of the EPDM insulative shield 24 and the lead barrier 26, and a compression ring 32 that is positioned over the boot seal 30. The tube 28, the rubber boot seal 30 and the compression ring 32 may or may not be considered as forming part of the power cable 4. Alternatively, those components may be considered as separable parts that form part of either the sleeve assembly 40 or part of the cable assembly 10.

The tube 28 provides a smooth surface upon which a ring seal 18 can translate, as will be described in greater detail later. The interior surface of the tube 28 may be adhered to the outer surface of the lead barrier 26 by a metal filled epoxy. One end of the tube 28 is positioned within a chamber 14 and is spaced apart from the boot seal 30. The opposite end of the tube 28 extends outside of the chamber 14.

The rubber boot seal 30, which is susceptible to damage upon contact with deleterious gases emanating outside of the chamber 14, is protected by dielectric fluid that is contained within the chamber 14. The boot seal 30 may be adhered to the exterior surface of either one or both of the insulative shield 24 and the lead barrier 26 by a metal filled epoxy.

The boot seal 30 is positioned on the power cable 4 such that its proximal end face 30' is positioned flush with the proximal end face of the insulative shield 24. The boot seal 30 also includes an exterior shoulder upon which a flange 32' of the compression ring 32 is seated. The flange 32' of the compression ring 32 is sandwiched between the boot seal 30 and a flange 41 of the outer sleeve 12.

Referring now to the features of the sleeve assembly 40, the sleeve assembly 40 is configured to releasably connect the power cable sub-assembly 2 to the power cable 4. For that reason, the sleeve assembly 40 may also be referred to herein as a 'connector.' The sleeve assembly 40 also prevents the boot seal 30 from exposure to harmful gases and liquids that surround the power cable 10 in use.

The sleeve assembly 40 generally includes a tubular-shaped outer sleeve 12, which is optionally composed of stainless steel, and a tubular-shaped ring seal 18, which is optionally composed of an elastomeric material, such as rubber. The outer surface of the ring seal 18 is positioned against an inner surface 20 of the outer sleeve 12, and the inner surface of the ring seal 18 is positioned against an outer surface of the tube 28. A flange 43 is disposed at the distal end of the interior surface of the outer sleeve 12 to prevent detachment of the ring seal 18 from the outer sleeve 12. The seal 18 includes a hole through which the stainless steel tube 28 of the power cable 4 passes.

An annular chamber 14 is defined between the interior surface 20 of the outer sleeve 12 and at least a portion of the exterior surfaces of the tube 28, the boot seal 30 and the lead barrier 26. The annular chamber 14 is filled with dielectric silicone grease or other dielectric fluid, as depicted by bubbles, by an operator. One or more surfaces of the boot seal 30, lead barrier 26, compression ring 32, insulative shield 24, ring seal 18 are at least partially immersed in the dielectric fluid. The dielectric fluid prevents the ingress of harmful liquids and gases into the chamber 14.

The chamber 14 is delimited by the ring seal 18. In operation, as shown in FIG. 1B, the ring seal 18 moves leftward when it is exposed to external pressure as any air pockets or compressible elements within the dielectric fluid will contract in volume (note difference in bubble size between FIGS. 1A and 1B). The ring seal 18 may return to its initial position once the external pressure subsides. This is referred to as a "pressure balanced" chamber.

At the proximal end of the sleeve assembly 40, the boot seal 30 and the compression ring 32 prevent escapement of the grease from the chamber 14. At the distal end of the sleeve assembly 40, the O-ring piston 18 seals against the surfaces of the sleeve 12 and the tube 28 to prevent escapement of the grease from the chamber 14.

The ring seal 18 includes a hole through which the stainless steel tube 28 of the power cable 4 passes. The outer surface of the ring seal 18 is positioned against the inner surface 20 of the outer sleeve 12. An elastomeric O-ring 31 is mounted in a channel that is formed on the interior surface of the ring seal 18. The O-ring 31 is positioned to bear on the exterior surface of the tube 28 to prevent the escapement of fluid at the interface between the interior surface of the ring seal 18 and the exterior surface of the tube 28. Another elastomeric O-ring 33 is mounted in a channel that is formed on the exterior surface of the ring seal 18. The O-ring 33 is positioned to bear on the interior surface of the outer sleeve 12 to prevent the escapement of fluid at the interface between the exterior surface of the ring seal 18 and the interior surface of the outer sleeve 12. Alternatively, the O-rings 31 and 33 may be replaced by C-rings that are formed of a metallic material.

Mechanical threads 42 are provided on the interior surface of the proximal end of the outer sleeve 12 for connecting the sleeve assembly 40 with mating threads on the power cable sub-assembly 2. Specifically, the mechanical threads 42 are configured for releasably engaging mating threads on the exterior surface of the mating sleeve 9 of the power cable sub-assembly 2. Item 42 may represent any connection means, such as a fastener, pin, slot, plug, socket, retainer, lock, adhesive, bolt, nut, engaging surface, engagable surface, magnet, or joint, for example.

FIG. 2 depicts an O-ring 44 that is positioned at the interface between the terminal end of the outer sleeve 12 and a channel 46 that is defined at the proximal end of the mating sleeve 9 of the power cable sub-assembly 2. The O-ring 44 prevents the escapement of fluid at the interface between the sleeves 9 and 12. The O-ring 44 may be replaced by a metallic C-ring, if so desired.

Referring back to FIGS. 1A, 1B and 2, and according to one exemplary method of assembling the power cable assembly 10, the ring seal 18 is positioned inside the outer sleeve 12. The tube 28 is mounted to the power cable 4. The tube 28 and the power cable 4 are then positioned through the hole in the seal 18. The rubber boot seal 30 and the compression ring 32 are mounted to the power cable 4. Before mating the sleeves 9 and 12 together, a pre-determined amount of dielectric fluid is distributed into the chamber 14. The threads 42 of the outer sleeve 12 of the sleeve assembly 40 are then engaged with the mating threads of the mating sleeve 9 of the power cable sub-assembly 2. Upon engaging those mechanical threads, a shoulder 41 of the outer sleeve 12 bears against the distal end of the compression ring 32, which bears against the boot seal 30, thereby compressing the proximal end face of the boot seal 30 against the proximal end face of the socket 5 of the power cable sub-assembly 2.

At the same time, the terminal end 7 of the copper conductor 6 of the power cable 4 seats in the recess of the socket 5 of the power cable sub-assembly 2, thereby creating a power connection between the power cable sub-assembly 2 and the power cable 4. Also, at the same time, the proximal ends of both the boot seal 30 and the insulative shield 24 bear against (but are disconnected from) the terminal end of the socket 5 of the power cable sub-assembly 2. The power cable assembly 10 is ready for use, and the power cable assembly 10 may be immersed in an oil well, or other environment.

The sleeve assembly 40 may be sold and distributed along with the power cable 4. That assembly may be supplied with or without a supply of dielectric fluid.

The sleeve assembly 40 may also be sold and distributed as a kit for retrofitting an existing power cable assembly. The kit would include, at a minimum, the outer sleeve 12 and the ring seal 18. The kit may also include the tube 28, the rubber boot seal 30, the compression ring 32 and/or a supply of dielectric fluid.

It should be understood that the materials recited herein may vary, the methods by which components are formed may vary, and the ways by which the components are connected together may vary.

Figure 3B:
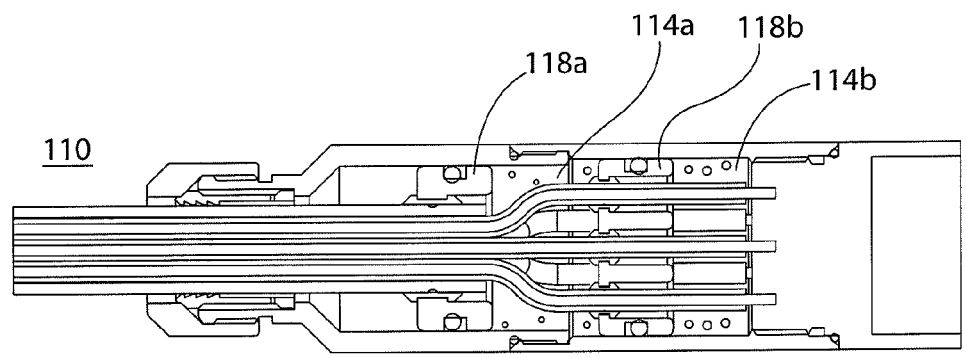
FIG. 3B depicts the power cable assembly of FIG. 3A exposed to external pressure.

FIG. 3A depicts a cross-sectional view of another power cable assembly 110 having multiple conductors 106, according to another exemplary embodiment of the invention. FIG. 3B depicts the power cable assembly 110 of FIG. 3A exposed to external pressure. Many of the details of the power cable assembly 10 also apply to the power cable assembly 110, and only the differences between those power cable assemblies will be described hereinafter.

The power cable assembly 110 generally includes a power cable sub-assembly 104 that is configured to be connected to an insulator 102 (or a mating power cable) by a sleeve assembly 140. The power cable 104 includes a plurality of discrete conductors 106 (three shown). The power cable 104 also includes a tube 128 that surrounds the conductors 106.

The tube 128 provides a smooth surface upon which a first ring seal 118a can translate, as will be described in greater detail later. The interior surface of the tube 128 may be adhered to the conductors 106 by a metal filled epoxy, for example. One end of the tube 128 is positioned within a chamber 114a, and the opposite end of the tube 128 extends outside of the chamber 114a.

Referring now to the features of the sleeve assembly 140, the sleeve assembly 140 is configured to releasably connect the power cable 104 to the insulator 102. For that reason, the sleeve assembly 140 may also be referred to herein as a 'connector.' The sleeve assembly 140 also shields the conductors 106 from exposure to harmful gases and liquids that surround the power cable assembly 110 in use.

The sleeve assembly 140 generally includes a two-piece tubular-shaped outer sleeve 112a and 112b (referred to collectively as outer sleeve 112), each of which is optionally composed of stainless steel, and two tubular-shaped ring seals 118a and 118b, which are optionally composed of an elastomeric material such as rubber. The ring seals 118a and 118b are positioned against an inner surface 120 of the outer sleeve 112. Angled surface 145 of the outer sleeve 112a prevents detachment of the ring seal 118a from the outer sleeve 112. Stops 143a and 143b are disposed along the outer sleeve 112b to prevent detachment of the ring seal 118b from the outer sleeve 112.

Unlike the sleeve assembly 40, the sleeve assembly 140 includes two fluid filled chambers 114a and 114b (referred to collectively as chambers 114) and two ring seals 118a and 118b (referred to collectively as ring seals 118) for the purpose of redundancy.

The ring seal 118a includes a hole through which the tube 128 of the power cable 104 passes. The ring seal 118a slides along the surface of the tube 128 in response to pressures emanating external to the power cable assembly 110, as evidenced by comparing FIGS. 3A and 3B.

The other ring seal 118b includes several holes, and a grommet 147 that is fixedly positioned in each hole. The number of holes and grommets corresponds to the number of conductors 106. Each conductor 106 of the cable 104 passes through an opening in one of the grommets 147, as shown. The grommets 147 of the ring seal 118b slide along the surface of the individual conductors 106 in response to pressures emanating external to the power cable assembly 110, as evidenced by comparing FIGS. 3A and 3B. Thus, the grommets 147 translate along with the ring seal 118b in response to external pressure.

One chamber 114a is defined between the ring seals 118a and 118b, and the other chamber 114b is defined between the ring seal 118b and the insulator 102. The annular chambers 114a and 114b are each filled with dielectric silicone grease or other dielectric fluid, as depicted by bubbles. The conductors 106 are at least partially immersed in the dielectric fluid. The dielectric fluid prevents the ingress of harmful liquids and gases into the chambers 114a and 114b.

In operation, as shown in FIG. 3B, the ring seals 118a and 118b move rightward when the ring seal 118a is exposed to external pressure as any air pockets or compressible elements within the dielectric fluid will contract in volume (note difference in bubble size between FIGS. 3A and 3B). The ring seals 118a and 118b may return to their initial positions in FIG. 3A once the external pressure subsides. This is referred to as a "pressure balanced" chamber.

As noted above, two ring seals 118 and two chambers 114 are provided for the purpose of redundancy. In the event that the first ring seal 118a fails, thereby resulting in contamination of the chamber 114a, a second failure would have to occur for the contamination to reach the other chamber 114b.

As an alternative to the embodiment shown in FIGS. 3A and 3B, the grommets 147 are fixed to the conductors 106 such that grommets 147 and the ring seal 118b can not translate over the conductors 106; and a moveable seal (not shown) is positioned over the seal 118b. The moveable seal would translate over the seal 118b in response to external pressure.

Although the invention is illustrated and described herein with reference to specific embodiments, the invention is not intended to be limited to the details shown. Rather, various modifications may be made in the details within the scope and range of equivalents of the claims and without departing from the spirit of the invention. For example, if the cables 4 and 104 are sufficiently smooth and cylindrical, and the ring seals 18 and 118a are sufficiently compliant, the tubes 28 and 128, respectively, may be omitted without sacrificing operational performance. The invention described herein is not limited to electrical power cables for oil wells. The details of the invention may be applied to any type of termination, wire, cable or cord that is used for any application.

What is claimed:

1. A pressure-balanced sleeve assembly for an electrical cable termination comprising:
    an outer sleeve surrounding an electrical cable;
    a chamber defined between an interior surface of the outer sleeve and an outer surface of the electrical cable;

dielectric fluid contained within the chamber; and a seal having an opening for receiving the electrical cable, the seal being positioned between the outer sleeve and the electrical cable to delimit and seal an end of the chamber to prevent the escapement of the dielectric fluid from the end of the chamber, and the seal being moveable along the electrical cable in response to differences between a pressure within the chamber and a pressure outside of the chamber.

2. The pressure-balanced sleeve assembly of claim 1, wherein the electrical cable comprises an inner conductive core, and insulative layer positioned over the inner conductive core, and a lead barrier that is positioned over the insulative layer.

3. The pressure-balanced sleeve assembly of claim 2, wherein a portion of the lead barrier extends outside of the chamber.

4. The pressure-balanced sleeve assembly of claim 1 further comprising a tube positioned over the electrical cable upon which the seal is capable of sliding.

5. The pressure-balanced sleeve assembly of claim 1 further comprising a rubber boot seal that is positioned between the outer sleeve and the electrical cable, wherein the rubber boot seal is at least partially immersed in the dielectric fluid.

6. The pressure-balanced sleeve assembly of claim 5, wherein the outer sleeve is configured to bias the rubber boot seal toward a mating electrical cable upon connecting the outer sleeve to the mating electrical cable.

7. The pressure-balanced sleeve assembly of claim 6 further comprising a compression ring that is at least partially sandwiched between the outer sleeve and the rubber boot seal.

8. The pressure-balanced sleeve assembly of claim 1 further comprising a second seal and another dielectric fluid filled chamber that is defined between the seals.

9. The pressure-balanced sleeve assembly of claim 1 further comprising a connection means defined on an end of the outer sleeve which is configured for releasable connection with a mating electrical cable.

10. The pressure-balanced sleeve assembly of claim 1, wherein the electrical cable includes a plurality of discrete conductors, and the seal is positioned in sealing contact with each of the conductors and is moveable over the conductors.

11. The pressure-balanced sleeve assembly of claim 1, further comprising O-ring seals positioned on an interior surface and an exterior surface of the seal.

12. A pressure-balanced electrical cable assembly comprising:

an electrical cable;

a tube positioned over the electrical cable;

an outer sleeve surrounding the electrical cable;

a chamber defined between an inner surface of the outer sleeve and an outer surface of the electrical cable;

dielectric fluid contained within the chamber; and a seal having an opening for receiving the tube, the seal being positioned between the tube and the outer sleeve to delimit and seal an end of the chamber in order to prevent the escapement of the dielectric fluid from the end of the chamber, the seal being moveable along the tube in response to differences between a pressure within the chamber and a pressure outside of the chamber.

13. The pressure-balanced electrical cable assembly of claim 12, wherein the electrical cable comprises an inner conductive core, and insulative layer positioned over the inner conductive core, and a lead barrier that is positioned over the insulative layer.

14. The pressure-balanced electrical cable assembly of claim 13, wherein a portion of the lead barrier extends outside of the chamber.

15. The pressure-balanced electrical cable assembly of claim 12, further comprising a rubber boot seal that is positioned between the outer sleeve and the electrical cable, wherein the rubber boot seal is at least partially immersed in the dielectric fluid.

16. The pressure-balanced electrical cable assembly of claim 12, further comprising a connection means defined on an end of the outer sleeve which is configured for releasable connection with a mating electrical cable.

17. A method of pressure-balancing a termination of an electrical cable comprising:

positioning a seal within an outer sleeve;

positioning the electrical cable within the outer sleeve and through a hole in the seal such that the seal is moveable along an outer surface of the electrical cable in response to differences between a pressure within a chamber and a pressure outside of the chamber;

distributing dielectric fluid within the chamber that is defined between an inner surface of the outer sleeve and the outer surface of the electrical cable and is delimited by the seal.

18. The method of claim 17 further comprising the step of connecting the outer sleeve to a mating electrical cable.

* * * * *